United States Patent
Nakao et al.

(10) Patent No.: US 9,237,049 B2
(45) Date of Patent: Jan. 12, 2016

(54) WIRELESS COMMUNICATION BASE STATION DEVICE, WIRELESS COMMUNICATION MOBILE STATION DEVICE, AND PROPAGATION PATH ESTIMATION METHOD

(75) Inventors: Seigo Nakao, Kanagawa (JP); Kenichi Miyoshi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 343 days.

(21) Appl. No.: 12/810,126

(22) PCT Filed: Dec. 24, 2008

(86) PCT No.: PCT/JP2008/003931
§ 371 (c)(1),
(2), (4) Date: Jul. 6, 2010

(87) PCT Pub. No.: WO2009/081580
PCT Pub. Date: Jul. 2, 2009

(65) Prior Publication Data
US 2010/0272201 A1 Oct. 28, 2010

(30) Foreign Application Priority Data
Dec. 25, 2007 (JP) ................................. 2007-332515

(51) Int. Cl.
*H04L 27/28* (2006.01)
*H04L 27/26* (2006.01)
(Continued)

(52) U.S. Cl.
CPC ............ *H04L 27/2613* (2013.01); *H04L 5/005* (2013.01); *H04L 5/0023* (2013.01); *H04L 25/0248* (2013.01); *H04L 25/03343* (2013.01); *H04B 7/0639* (2013.01)

(58) Field of Classification Search
CPC ... H04L 27/2647; H04L 5/0053; H04L 5/001; H04B 1/1027; H04W 72/042; H04W 56/001; H04W 72/0406
USPC ......... 375/141, 219, 220, 260, 267, 296, 316, 375/346; 370/336, 342, 344, 329, 330, 348; 455/69, 452.2
See application file for complete search history.

(56) References Cited

U.S. PATENT DOCUMENTS 7,636,381 B2 * 12/2009 Forenza et al. ............... 375/141
7,965,780 B2 * 6/2011 Lindoff et al. ............... 375/260
(Continued)

FOREIGN PATENT DOCUMENTS

JP 2004-260322 9/2004
JP 2006-25328 1/2006
(Continued)

OTHER PUBLICATIONS

Nortel Networks, "Precoding Matrix Verification based on Dedicated RS in E-UTRA Downlink," R1-073300, Agenda Item: 7.2.6, 3GPP TSG-RAN Working Group 1 Meeting #50, Athens, Greece, Aug. 20-24, 2007, 7 pages.*
(Continued)

*Primary Examiner* — Daniel Washburn
*Assistant Examiner* — Fitwi Hailegiorgis
(74) *Attorney, Agent, or Firm* — Seed IP Law Group PLLC

(57) ABSTRACT

A wireless communication base station device, whereby precision of propagation path estimation is improved by making possible determination of the contiguity of precoding strings contiguous in frequency regions. In this device, a pre-coding string contiguity determining portion (120) determines whether or not a plurality of pre-coding strings (?) which are input from a pre-coding string calculating portion (119) are contiguous in a frequency region. The pre-coding string contiguity determining portion (120) outputs smoothing possibility data, which indicate determination results, to a control data generating portion (104). The control data generating portion (104) generates control data indicating smoothing possibility data which is input from the pre-coding string contiguity determining portion (120).

10 Claims, 8 Drawing Sheets

(51) Int. Cl.
    *H04L 5/00*     (2006.01)
    *H04L 25/02*     (2006.01)
    *H04L 25/03*     (2006.01)
    *H04B 7/06*     (2006.01)

(56) References Cited

U.S. PATENT DOCUMENTS

| | | | |
|---|---|---|---|
| 7,995,642 B2* | 8/2011 | Khan | 375/219 |
| 8,077,793 B2* | 12/2011 | Khan et al. | 375/267 |
| 8,571,001 B2 | 10/2013 | Ogawa et al. | |
| 2008/0049712 A1* | 2/2008 | Terabe et al. | 370/348 |
| 2008/0080459 A1* | 4/2008 | Kotecha et al. | 370/342 |
| 2008/0096488 A1* | 4/2008 | Cho et al. | 455/69 |
| 2008/0096574 A1* | 4/2008 | Khandekar et al. | 455/452.2 |
| 2008/0123616 A1* | 5/2008 | Lee | 370/344 |
| 2008/0130589 A1* | 6/2008 | Gorokhov et al. | 370/336 |
| 2008/0192622 A1* | 8/2008 | Scheim et al. | 370/210 |
| 2008/0205533 A1* | 8/2008 | Lee et al. | 375/260 |
| 2008/0225791 A1* | 9/2008 | Pi et al. | 370/330 |
| 2008/0232449 A1* | 9/2008 | Khan et al. | 375/220 |
| 2009/0003274 A1* | 1/2009 | Kwak et al. | 370/329 |
| 2009/0296563 A1 | 12/2009 | Kishiyama | |
| 2010/0008445 A1* | 1/2010 | Khan | 375/296 |
| 2010/0091919 A1* | 4/2010 | Xu et al. | 375/346 |
| 2010/0103901 A1* | 4/2010 | Miki et al. | 370/330 |
| 2010/0118803 A1* | 5/2010 | Ishii et al. | 370/329 |
| 2010/0246559 A1 | 9/2010 | Ogawa et al. | |
| 2013/0308583 A1 | 11/2013 | Ogawa et al. | |

FOREIGN PATENT DOCUMENTS

| | | |
|---|---|---|
| WO | 2006/134949 | 12/2006 |
| WO | 2007/119591 A1 | 10/2007 |

OTHER PUBLICATIONS

Motorola, "Proposal for Dedicated Pilots in Downlink Precoding for EUTRA MIMO," R1-070770, Agenda Item: 6.6.1, 3GPP TSG RAN WG1 Meeting #48, St. Louis, USA, Feb. 12-16, 2007, 5 pages.*
International Search Report dated Apr. 14, 2009.
3GPP TS 36.211 V8.0.0, "Physical Channels and Modulation (Release 8)," Sep. 2007, 50 pages.
H. Nishimoto, et al., "Pseudo Eigenbeam-Space Division Multiplexing in Frequency Selective Fading Environments," IEICE Technical Report, RCS2006-56, Jun. 2006, 6 pages, with English abstract.
IPWireless, "Consideration on non-codebook based pre-coding for TDD," R1-070576, Agenda Item: 6.7.2 Precoding details, 3GPP TSG RAN WG1#47, Sorrento, Italy, Jan. 15-19, 2007, 4 pages.
Motorola, "Frequency-Domain Adaptive Precoding for EUTRA MIMO," R1-063058, Agenda Item: 6.5.3, 3GPP TSG RAN WG1 Meeting #47, Riga, Latvia, Nov. 6-10, 2006, 4 pages.
Motorola, "Proposal for Dedicated Pilots in Downlink Precoding for EUTRA MIMO," R1-070770, Agenda Item: 6.6.1, 3GPP TSG RAN WG1 Meeting #48, St. Louis, USA, Feb. 12-16, 2007, 5 page.
Notice of the Reasons for Rejection, dated Jul. 31, 2012, for corresponding Japanese Application No. 2009-546950, 3 pages.

* cited by examiner

WIRELESS COMMUNICATION BASE STATION DEVICE, WIRELESS COMMUNICATION MOBILE STATION DEVICE, AND PROPAGATION PATH ESTIMATION METHOD

TECHNICAL FIELD

The present invention relates to a radio communication base station apparatus, a radio communication mobile station apparatus and a channel estimation method.

BACKGROUND ART

In 3GPP RAN LTE (3rd Generation Partnership Project Radio Access Network Long Term Evolution), OFDMA (Orthogonal Frequency Division Multiple Access) is adopted as a downlink communication scheme. In 3GPP RAN LTE, a radio communication base station apparatus (hereinafter a "base station") transmits a reference signal (RS) using predetermined communication resources, and a radio communication terminal apparatus (hereinafter a "mobile station") estimates channels using a received reference signal to demodulate data (see Non-Patent Document 1).

Further, when a base station has a plurality of antenna ports, the base station can perform diversity transmission. 3GPP RAN LTE defines transmission weight referred to as a "precoding matrix" for achieving transmission diversity effect. A precoding matrix is determined by open loop or closed loop weight control.

Here, closed loop weight control includes dedicated beam forming that uses an eigenmode transmission technique, whereby individual signals can be transmitted and received in the same band at the same time by a plurality of eigenvectors. With dedicated beam forming, the base station multiplies transmission data by a precoding matrix in accordance with downlink channels, to perform beam forming. By this means, reception power of received data in the mobile station can improve. Here, with dedicated beam forming, the mobile station estimates channel conditions using an RS as is added to transmission data subject to beam forming and is able to demodulate data.

FIG. 1 shows a configuration of a base station having two antenna ports (2-Tx base station) assumed in 3GPP RAN LTE. Upon performing dedicated beam forming, a precoding section in the base station shown in FIG. 1 multiplies transmission data by a precoding matrix. Here, when the transmission data outputted from the mapping section is s and the precoding matrix by which the transmission data is multiplied in the precoding section is Φ, signal y transmitted from the base station is,

[1]

$$y = \Phi s \quad \text{(Equation 1)}$$

where s is n–(n=2) dimensional vector, Φ is a matrix of (the number of antenna ports×n). Further, n is the number of layers in a signal, that is, the number of signals to be subject to space division multiplex (SDM).

Here, assuming that a channel matrix showing channel conditions between the base station and the mobile station is H, in the mobile station, it seems that transmission data s is received through an effective channel HΦ. That is, when transmission data is multiplied by precoding matrix Φ, in the mobile station, an effective channel is changed from channel matrix H (actual channel) to channel matrix HΦ multiplied by precoding matrix Φ. Accordingly, to receive transmission data s without an error, the mobile station needs to identify effective channel matrix HΦ.

In 3GPP RAN LTE, as shown in FIG. 2, common RSs (R0 and R1) determined between the base station and the mobile station in advance are transmitted from all antenna ports in the base station. In FIG. 2, the vertical axis (frequency domain) is subcarrier units, and the horizontal axis (time domain) is OFDM symbol units. One slot is formed with 7 OFDM symbols. R0 and R1 show RSs transmitted from antenna ports 0 and 1 (i.e. a first and a second antenna ports), respectively. A unit of one block surrounded by the bold line (12 subcarriers in the frequency domain and 7 OFDM symbols in the time domain) is referred to as a "resource block (RB)."

However, with dedicated beam forming, it is necessary to optimize precoding matrix Φ in accordance with channel conditions changing over time, and therefore it is difficult to define precoding matrix Φ for dedicated beam forming in advance. Accordingly, in 3GPP RAN LTE, precoding matrix Φ for dedicated beam forming is not defined, and precoding matrix Φ cannot be set between the base station and the mobile station in advance. Further, the common RSs shown in FIG. 2 are transmitted without being multiplied by precoding matrix Φ, and therefore the mobile station cannot estimate an effective channel (HΦ) using common RSs. Then, in 3GPP RAN LTE, studies are conducted for a dedicated RS for notifying an effective channel to mobile stations in a dedicated manner.

FIG. 3 shows an RS transmission method in a 2-Tx base station. As shown in FIG. 1, common RSs (R0 and R1) shown in FIG. 3 are transmitted without being multiplied by precoding matrices to the mobile station. Meanwhile, as shown in FIG. 1, dedicated RSs shown in FIG. 3 are multiplied by the same precoding matrices Φ as transmission data and transmitted to a mobile station. For example, the dedicated RS mapped in subcarrier number 2 shown in FIG. 3 is multiplied by precoding matrix Φ(2) found by actual channel matrix H(2) in the frequency of subcarrier number 2. By using dedicated RSs, the mobile station can estimate effective channel H(2)Φ(2). Accordingly, precoding matrix Φ is not set between the base station and the mobile station in advance, and, even when the base station sets up a precoding matrix, the mobile station is able to estimate an effective channel matrix to receive data.

As described above, by transmitting dedicated RSs from the base station, the mobile station can estimate effective channel HΦ. Here, precoding matrix Φ can be acquired by performing singular value decomposition of channel matrix H. Specifically, in the base station, matrix V calculated by singular value decomposition shown in the following equation is precoding matrix Φ.

[2]

$$H = U\Sigma V^H \quad \text{(Equation 2)}$$

U and V are unitary matrices, and Σ is a diagonal matrix. Further, V is a square matrix (of the number of antenna ports×the number of antenna ports) of the base station. When the value of n differs from the number of antenna ports, the first n columns of V are precoding matrix Φ.

Further, transmission data y transmitted from the base station becomes Vs from equation 1, received signal HVs received in the mobile station is shown in the following equation.

[3]

$$HVs = U\Sigma V^H Vs = U\Sigma s \quad \text{(Equation 3)}$$

Here, by setting up $U^H$ for reception weight, a received signal after multiplying reception weight is shown in the following equation.

[4]

$$U^H H V s = U^H U \Sigma s = \Sigma s \quad \text{(Equation 4)}$$

By this means, the mobile station is able to handle that transmission data s is received through channel $\Sigma$ shown in a diagonal matrix.

Further, there is smoothing processing as processing to improve the accuracy of channel estimation in the mobile station. With smoothing processing, filtering is performed for a channel estimation result of continuous subcarriers in the frequency domain. For example, as the easiest smoothing processing, there is processing to average channel estimation results between neighboring subcarriers in the frequency domain. Smoothing processing is a method of using continuity of a channel in the frequency domain, and therefore it is known that, when smoothing processing is performed between subcarriers where channels of frequencies that are continuous in the frequency domain are not continuous, the accuracy of channel estimation deteriorates (e.g. see Non-Patent Document 2).

Non-Patent Document 1: 3GPP TS 36.211 V8.0.0 "Physical Channels and Modulation (Release 8)," September 2007 (ftp://ftp.3gpp.org/Specs/2007-09/Re1-8/36 series/36211-800.zip) Non-Patent Document 2: H. Nishimoto, T. Nishimura, T. Ohgane, Y. Ogawa, "Pseudo Eigenbeam-Space Division Multiplexing in Frequency Selective Fading Environments," IEICE Technical Report, RCS2006-56, 2006-6

DISCLOSURE OF INVENTION

Problems to be Solved by the Invention

Channel matrices H are different in frequency units, and therefore, when dedicated beam forming is performed optimally, it is necessary to calculate precoding matrices every frequency unit in which dedicated RSs are mapped and use those precoding matrices for the neighboring data subcarriers. For example, in the RS transmission method shown in FIG. 3, the base station needs to calculate precoding matrices Φ individual on a per dedicated RS basis mapped in subcarriers of subcarrier numbers 2, 5, 8, 11, 14, 17, 20 and 23 (matrices V shown in equation 2). However, matrices V shown in equation 2 have uncertain phase. Accordingly, even when channel matrices H are continuous in the frequency domain, matrices V may not be continuous in the frequency domain. That is, when dedicated RSs continuous in the frequency domain are multiplied by precoding matrices Φ (matrices V), effective channel HΦ in the mobile station may be not continuous in the frequency domain. In this way, when effective channel HΦ is not continuous in the frequency domain, by performing smoothing processing in the mobile station, the accuracy of channel estimation deteriorates. Further, the mobile station estimates channels using dedicated RSs as is transmitted from the base station, and therefore the mobile station does not know whether or not dedicated RSs that are continuous in the frequency domain are continuous. Therefore, to improve the accuracy of channel estimation, the mobile station needs to decide accurately whether or not to perform smoothing processing.

It is therefore an object of the present invention to provide a radio communication base station apparatus, a radio communication mobile station apparatus and a channel estimation method that make it possible to check the continuity of precoding matrices that are continuous in the frequency domain and improve the accuracy of channel estimation.

Means for Solving the Problem

The radio communication apparatus of the present invention adopts the configuration including: a check section that checks whether or not a plurality of precoding matrices are continuous in a frequency domain; and a transmitting section that transmits a signal showing a check result in the check section to a radio communication mobile station apparatus.

Advantageous Effects of Invention

According to the present invention, it is possible to check the continuity of precoding matrices that are continuous in the frequency domain and improve the accuracy of channel estimation.

BEST MODE FOR CARRYING OUT THE INVENTION

Now, embodiments of the present invention will be described in detail with reference to the accompanying drawings.

Embodiment 1

With the present embodiment, a base station checks whether or not continuous subcarriers in the frequency domain employ continuous precoding matrices.

Figure 4:
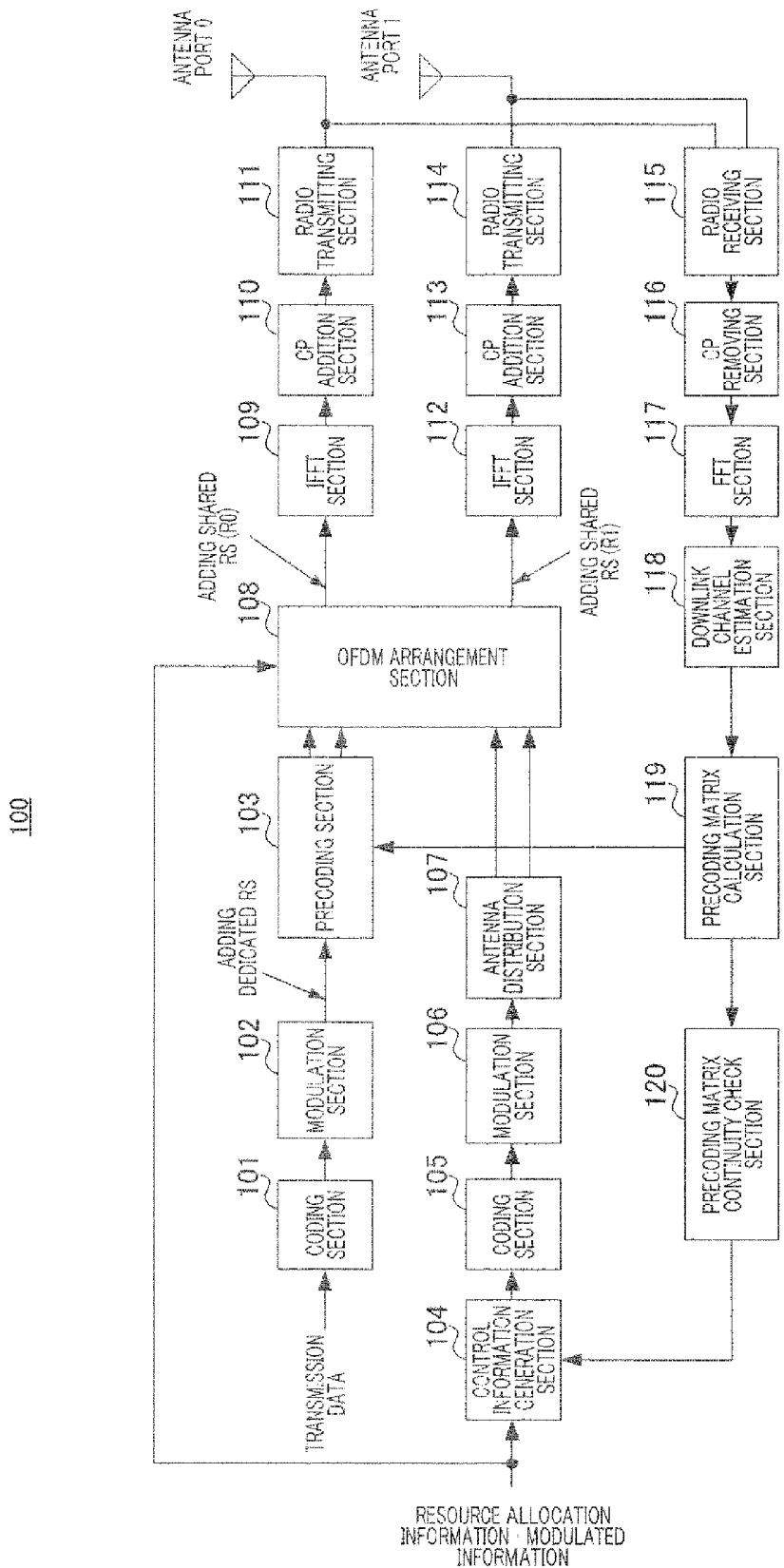
FIG. 4 is a block diagram showing a configuration of a base station according to Embodiment 1 of the present invention

Now, base station 100 according to the present embodiment will be explained below. FIG. 4 shows the configuration of base station 100 according to the present embodiment.

In base station 100 shown in FIG. 4, coding section 101 encodes transmission data, and outputs the encoded transmission data to modulation section 102. For example, transmission data is allocated to a PDSCH (Physical Downlink Shared CHannel).

Modulation section 102 modulates the encoded transmission data, and outputs the modulated transmission data to precoding section 103. Further, a dedicated RS for demodulating transmission data in the mobile station is added to the modulated transmission data outputted from modulation section 102.

Precoding section 103 multiplies the modulated transmission data by a precoding matrix received as input from precoding matrix calculation section 119, to perform precoding. Further, in precoding section 103, the same precoding matrix as the precoding matrix by which the transmission data is multiplied, is multiplied by a dedicated RS. Then, precoding section 103 distributes the transmission data after precoding to transmission data allocated to antenna port 0 and transmission data mapped at antenna port 1, and outputs them to OFDM mapping section 108.

Control information generation section 104 generates resource allocation information showing resources to which transmission data is allocated, modulation information showing a modulation scheme for transmission data, and control information including smoothing applicable/not applicable information received as input from precoding matrix continuity check section 120. For example, control information is allocated to a PDCCH (Physical Downlink Control CHannel). Further, to identify mobile stations to which a plurality of pieces of control information (PDCCH) are transmitted at the same time, control information generation section 104 includes CRC (Cyclic Redundancy Check) bits scrambled by scramble codes uniquely assigned per mobile station, in control information addressed to the mobile stations. Then, control information generation section 104 outputs the generated control information to coding section 105.

Coding section 105 encodes the control information (PDCCH) received as input from control information generation section 104, and outputs the encoded control information to modulation section 106.

Modulation section 106 modulates encoded control information, and outputs the modulated control information to antenna distribution section 107.

Antenna distribution section 107 distributes the control information received as input from modulation section 106 to control information allocated to antenna port 0 and control information allocated to antenna port 1, and outputs them to OFDM mapping section 108.

Based on resource allocation information, OFDM mapping section 108 maps the precoding transmission data received as input from precoding section 103 and the control information received as input from antenna distribution section 107 to one of a plurality of subcarriers forming an OFDM symbol of a multicarrier signal. Further, a common RS for demodulating control information that is not multiplied by a precoding matrix is added to the signal outputted from OFDM mapping section 108. To be more specific, R0 of a common RS is added to a signal to be transmitted from antenna port 0. Likewise, R1 of a common RS is added to a signal to be transmitted from antenna port 1. Then, among the signals in which each signal is mapped, OFDM mapping section 108 outputs the signal to be transmitted from antenna port 0 to IFFT (Inverse Fast Fourier Transform) section 109 and outputs the signal to be transmitted from antenna port 1 to IFFT section 112.

IFFT section 109 performs an IFFT for subcarriers to which the transmission data and the control information to be transmitted from antenna port 0 are mapped individually, to generate an OFDM symbol.

CP (Cyclic Prefix) adding section 110 attaches the same signal as the tail part of the OFDM symbol, to the beginning of this OFDM symbol, as a CP.

Radio transmitting section 111 performs transmitting processing including D/A conversion, amplification and up-conversion on the OFDM symbol after the addition of a CP, and transmits the OFDM symbol after transmitting processing from antenna port 0.

IFFT section 112 performs an IFFT for subcarriers to which the transmission data and the control information to be transmitted from antenna port 1 are mapped individually, to generate an OFDM symbol.

CP adding section 113 attaches the same signal as the tail part of the OFDM symbol, to the beginning of this OFDM symbol, as a CP.

Radio transmitting section 114 performs transmitting processing including D/A conversion, amplification and up-conversion on the OFDM symbol after the addition of a CP, and transmits the OFDM symbol after transmitting processing from antenna port 1.

Meanwhile, radio receiving section 115 receives a signal transmitted from a mobile station, via antenna ports 0 and 1, and performs receiving processing including down-conversion and A/D conversion on this signal.

CP removing section 116 removes the CP attached to the signal after receiving processing.

FFT (Fast Fourier Transform) section 117 performs an FFT on the signal without the CP, and outputs a frequency domain received signal to downlink channel estimation section 118.

Downlink channel estimation section 118 estimates an uplink channel using training data transmitted from the mobile station and known between the base station and the mobile station and using the received signal received as input from FFT section 117, to calculate a downlink channel estimation result. Here, TDD (Time Division Duplex) using the same frequency in uplink and downlink, is assumed as the method of multiplexing an uplink signal and a downlink signal. In TDD, uplink and downlink have high correlation in channel conditions, so that it is possible to estimate a downlink channel symmetrical to an uplink channel estimation result.

Figure 1:
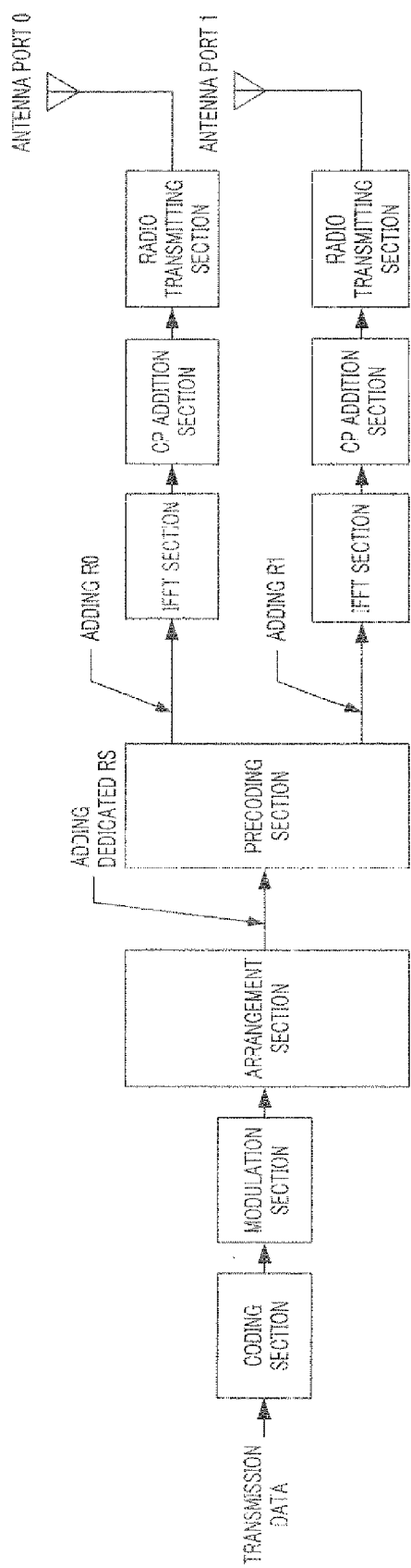
FIG. 1 is a block diagram showing a configuration of a conventional base station.
Figure 2:
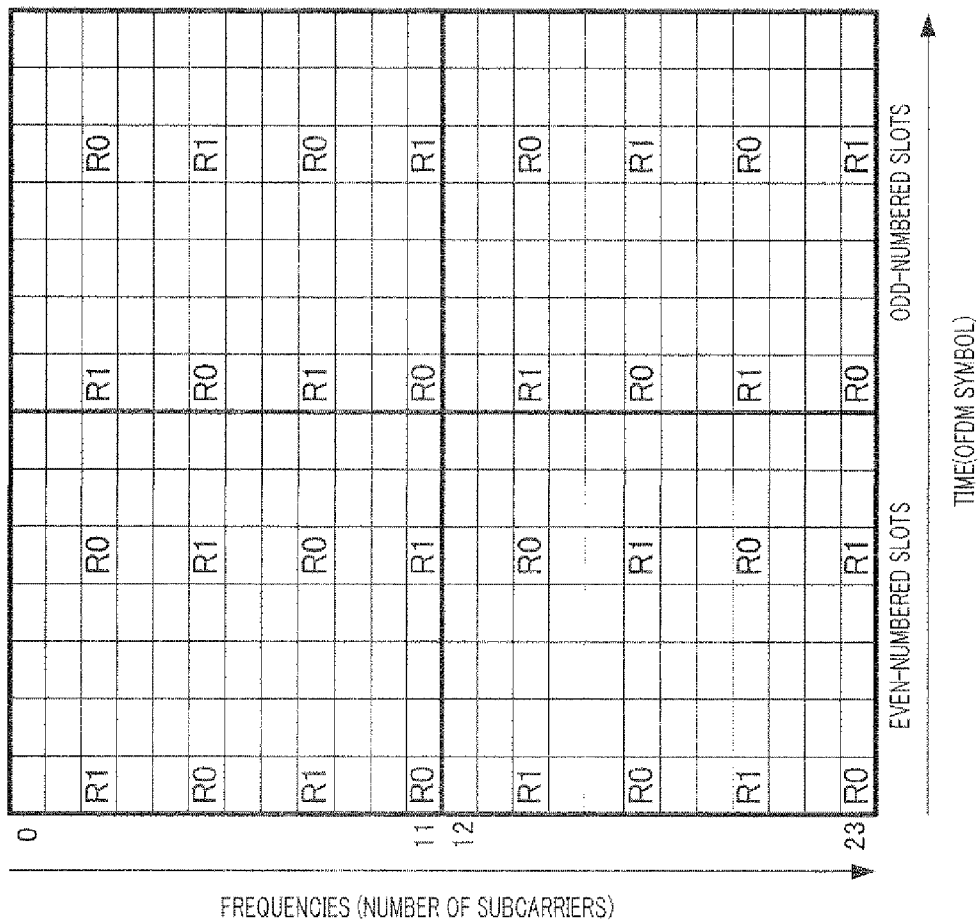
FIG. 2 shows an RS transmission method in the conventional base station.
Figure 3:
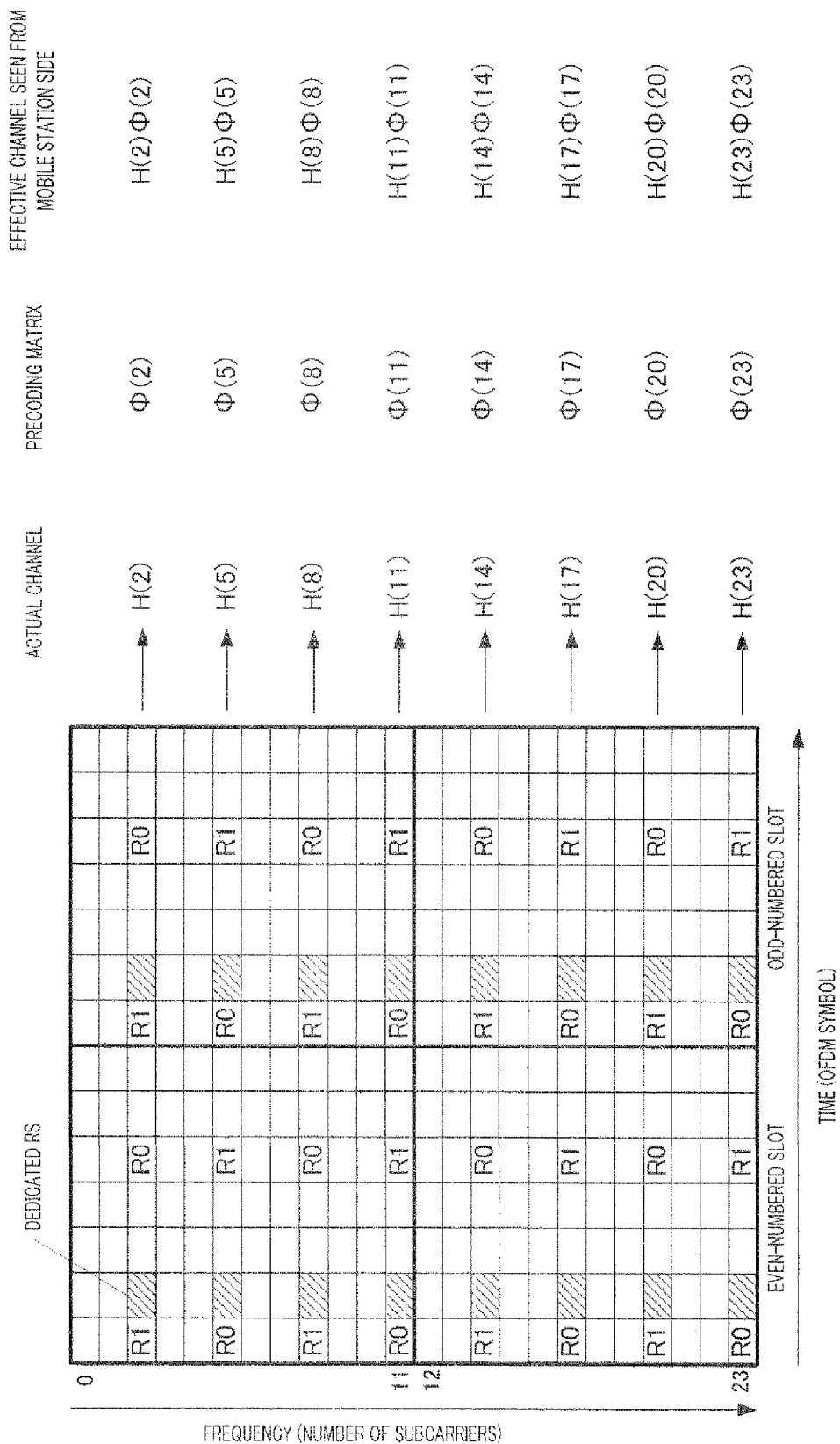
FIG. 3 shows a dedicated RS transmission method in the conventional base station.

Further, downlink channel estimation section 118 estimates channel matrices H per group of subcarriers over which dedicated RSs are individually transmitted. That is, as shown in FIG. 3, one dedicated RS is mapped every three subcarriers, and therefore downlink channel estimation section 118 estimates one channel matrix H for three subcarriers. For example, downlink channel estimation section 118 estimates one channel matrix H(2) for a subcarrier group of subcarrier numbers 0 to 2, as shown in FIG. 3. Then, downlink channel estimation section 118 outputs the estimated channel matrices H to precoding matrix calculation section 119.

Based on the estimated channel matrices H per subcarrier group received as input from downlink channel estimation section 118, precoding matrix calculation section 119 calculates precoding matrices Φ (matrices V) per that subcarrier group. Specifically, precoding matrix calculation section 119 calculates precoding matrices Φ by performing singular value decomposition represented in equation 2 for the estimated channel matrices H. Then, precoding matrix calculation section 119 outputs the calculated precoding matrices Φ to precoding section 103 and precoding matrix continuity check section 120.

Figure 5:
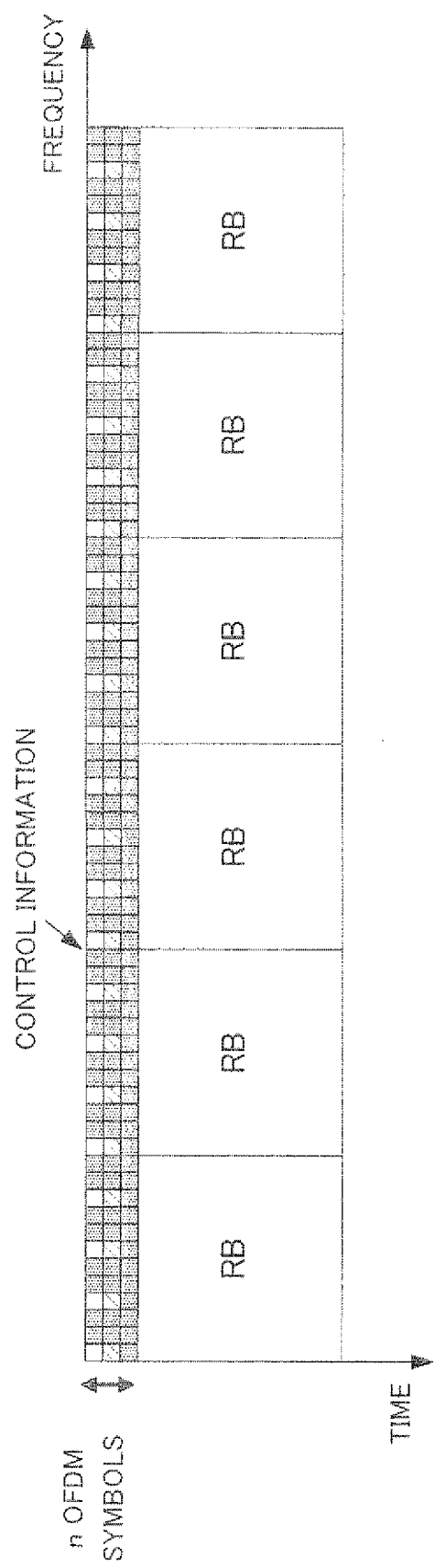
FIG. 5 shows a configuration of OFDM symbols according to Embodiment 1 of the present invention.

Precoding matrix continuity check section 120 checks whether or not a plurality of precoding matrices Φ received as input from precoding matrix calculation section 119 are continuous in the frequency domain. Then, precoding matrix continuity check section 120 outputs smoothing applicable/not applicable information showing the check result to control information generation section 104. Here, control information including smoothing applicable/not applicable information (PDCCH) is mapped within n (n≤3) OFDM symbols to which control information is allocated, as shown in FIG. 5. Further, base station 100 does not apply to this control information dedicated beam forming using an eigenmode transmission technique. Accordingly, precoding matrix continuity check section 120 may check whether or not to have continuity in only subcarriers forming RBs allocated to mobile stations adopting dedicated beam forming within OFDM symbols other than the OFDM symbols allocated for control information among a plurality of OFDM symbols. Base station 100 may use precoding matrices determined between the base station and the mobile station in advance for control information (PDCCH). The precoding matrix continuity check processing in precoding matrix continuity check section 120 will be described later in detail.

Figure 6:
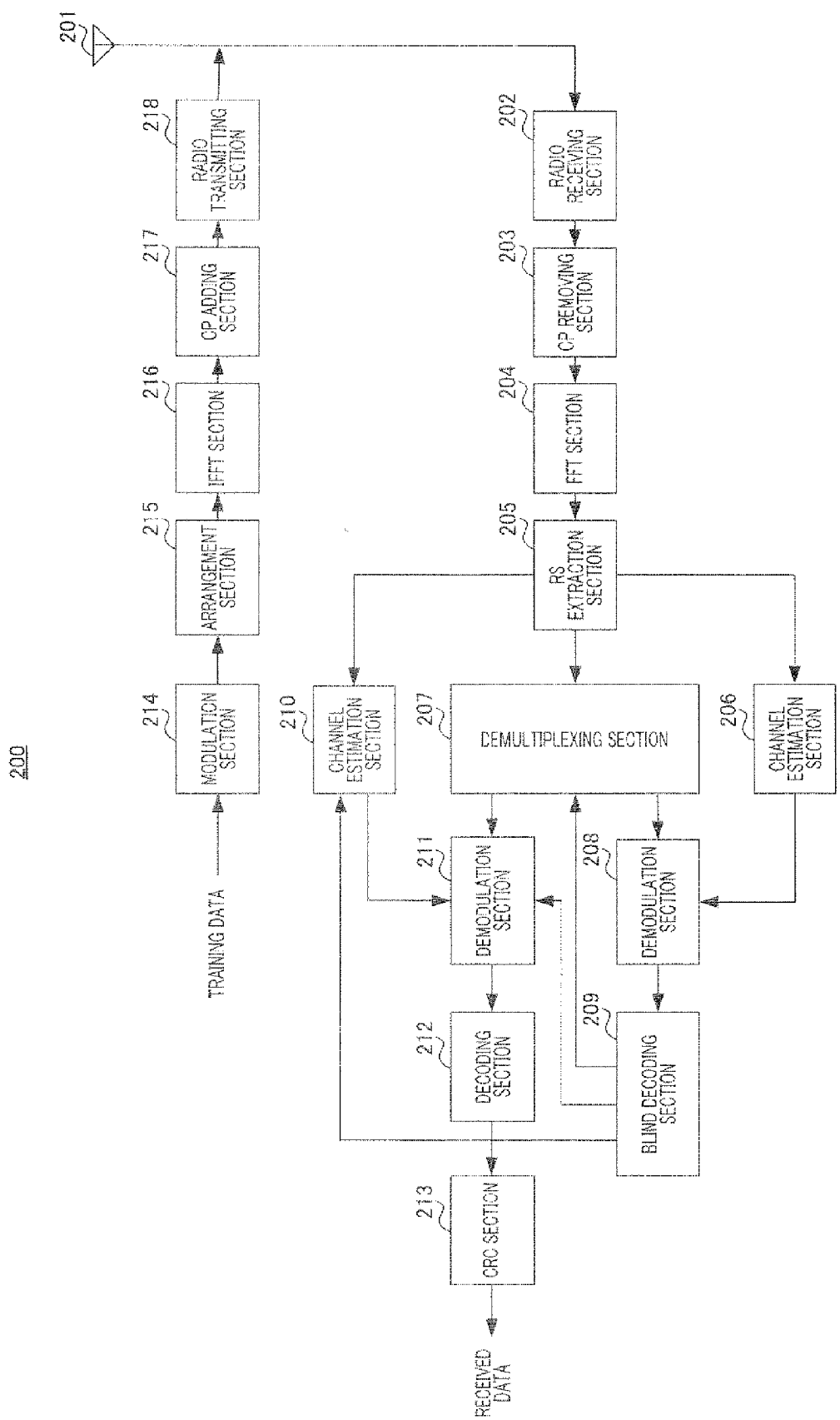
FIG. 6 is a block diagram showing a configuration of the mobile station according to Embodiment 1 of the present invention.

Next, FIG. 6 shows the configuration of mobile station 200 according to the present embodiment.

In mobile station 200 shown in FIG. 6, radio receiving section 202 receives an OFDM symbol transmitted from base station 100 (FIG. 4) via antenna 201, and performs receiving processing including down-conversion and A/D conversion on the OFDM symbol.

CP removing section 203 removes the CP attached to the OFDM symbol after receiving processing.

FFT section 204 performs an FFT on the OFDM symbol received as input from CP removing section 203, acquires resource allocation information mapped in a plurality of subcarriers, modulation information and control information including smoothing applicable/not applicable information or downlink data, and outputs those to RS extraction section 205.

RS extraction section 205 extracts dedicated RSs and common RSs (R0 and R1) from the signal received as input from FFT section 204. Then, RS extraction section 205 outputs the dedicated RSs to channel estimation section 210 and the common RSs to channel estimation section 206. Further, RS extraction section 205 outputs to demultiplexing section 207 signals other than the dedicated RSs and the common RSs among the signals received as input from FFT section 204.

Based on the common RSs (R0 and R1) received as input from RS extraction section 205, channel estimation section 206 estimates channel conditions for control information (PDCCH). Then, channel estimation section 206 outputs a channel estimation result to demodulation section 208.

Demultiplexing section 207 demultiplexes all control information mapped for the resources allocated for control information of each mobile station from the signals received as input from RS extraction section 205, and outputs the demultiplexed control information to demodulation section 208. Further, based on the resource allocation information received as input from blind decoding section 209, demultiplexing section 207 demultiplexes downlink data addressed to the mobile station from the signal received as input from RS extraction section 205, and outputs the demultiplexed downlink data addressed to the mobile station to demodulation section 211.

Demodulation section 208 demodulates the control information using the channel estimation result received as input from channel estimation section 206, and outputs the demodulated control information to blind decoding section 209.

Blind decoding section 209 performs blind decoding for the control information (PDCCH) received as input from demodulation section 208. Specifically, blind decoding section 209 first decodes the control information (PDCCH) received as input from demodulation section 208. Then, blind decoding section 209 descrambles the CRC bits included in the decoded control information by a scrambling code uniquely assigned to the mobile station. Blind decoding section 209 performs a CRC check for the descrambled control information. Blind decoding section 209 checks control information showing a CRC decision result CRC=OK (no error) as control information addressed to the mobile station. Then, blind decoding section 209 outputs to demultiplexing section 207 resource allocation information of downlink data addressed to the mobile station included in the control information addressed to the mobile station, outputs the smoothing applicable/not applicable information to channel estimation section 210 and outputs the downlink data modulation information addressed to the mobile station to demodulation section 211.

Channel estimation section 210 estimates a downlink data channel based on the dedicated RSs received as input from RS extraction section 205 and the smoothing applicable/not applicable information received as input from blind decoding section 209. Specifically, first, similar to channel estimation section 206, based on dedicated RSs received as input from RS extraction section 205, channel estimation section 210 estimates channel conditions for downlink data (PDSCH). Then, when the continuity check result between subcarriers shown in the smoothing applicable/not applicable information shows continuity, channel estimation section 210 performs smoothing processing for the channel estimation result of the frequencies corresponding to those subcarriers, and outputs the channel estimation result after smoothing processing to demodulation section 211. Meanwhile, when the continuity check result between subcarriers shown in the smoothing applicable/not applicable information shows discontinuity, channel estimation section 210 outputs the channel estimation result as is to demodulation section 211 without performing smoothing processing for the channel estimation result of the frequencies corresponding to those subcarriers. That is, channel estimation section 210 performs smoothing processing between precoding matrices that are continuous in the frequency domain, and does not perform smoothing processing between precoding matrices that are not continuous in the frequency domain.

Demodulation section 211 demodulates downlink data addressed to the mobile station received as input from demultiplexing section 207 using the modulation information received as input from blind decoding section 209 and the channel estimation result received as input from channel estimation section 210. Then, demodulation section 211 outputs the demodulated downlink data to decoding section 212.

Decoding section 212 decodes the demodulated downlink data, and outputs the demodulated downlink data to CRC section 213.

CRC section 213 performs error detection for the decoded downlink data using CRC, and generates an ACK if CRC=OK (no error) or a NACK if CRC=NG (error present), as a response signal. Further, CRC section 213 outputs decoded downlink data as received data if CRC=OK (no error).

Meanwhile, modulation section 214 modulates uplink training data known between base station 100 and mobile station 200 in advance, and outputs the modulated training data to mapping section 215. Training data is used for channel estimation in base station 100.

Mapping section 215 maps the modulated training data to resources reserved for training data, and outputs the signal in which training data is mapped, to IFFT section 216.

IFFT section 216 performs an IFFT for a plurality of subcarriers in which the training data is mapped.

CP adding section 217 attaches the same signal as the tail part of the training data after IFFT, to the beginning of this training data, as a CP.

Radio transmitting section 218 performs transmitting processing including D/A conversion, amplification and up-conversion on the training data with a CP, and transmits the training data after transmitting processing from antenna 201.

Next, the precoding matrix continuity check processing in precoding matrix continuity check section 120 will be described in detail.

Precoding matrix continuity check section 120 checks whether or not continuous subcarrier groups in the frequency domain employ continuous precoding matrices. Specifically, precoding matrix continuity check section 120 calculates the value $V(f1)^H V(f0)$ in matrix V that is shown in equation 2, and that is precoding matrix $\Phi$ shown in equation 2. Here, f0 and f1 are the frequencies of subcarrier groups that are continuous in the frequency domain.

Figure 7:
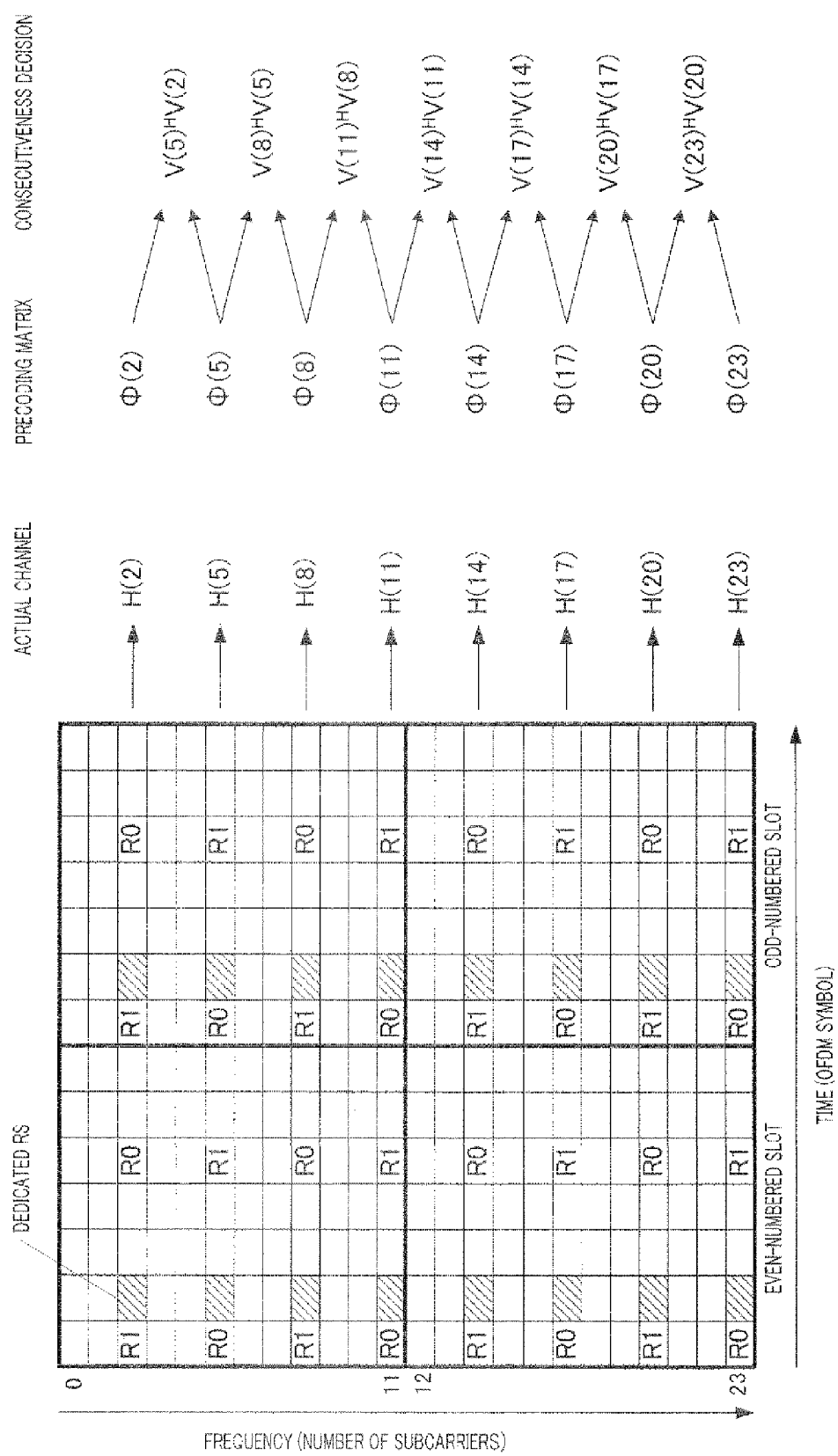
FIG. 7 shows precoding matrix continuity check processing according to Embodiment 1 of the present invention.

For example, in a dedicated RS transmission method shown in FIG. 7, similar to FIG. 3, dedicated RSs are mapped in subcarriers of subcarrier numbers 2, 5, 8, 11, 14, 17, 20 and 23 and, furthermore, multiplied by precoding matrices corresponding to subcarriers in which data is individually mapped and which has the numbers of 0 to 2, 3 to 5, 6 to 8, 9 to 11, 12 to 14, 15 to 17, 18 to 20 and 21 to 23. Then, precoding matrix continuity check section 120 checks whether or not precoding matrices by which dedicated RSs mapped in continuous subcarriers in the frequency domain (i.e. dedicated RSs mapped in neighboring subcarriers in the frequency domain) are multiplied, are continuous. That is, precoding matrix continuity check section 120 checks continuity between precoding matrix $\Phi(2)=V(2)$ by which the dedicated RS mapped in subcarrier number 2 is multiplied and precoding matrix $\Phi(5)=V(5)$ by which the dedicated RS mapped in subcarrier number 5 is multiplied as shown in FIG. 7. Specifically, precoding matrix continuity check section 120 calculates the value $V(5)^H V(2)$ as shown in FIG. 7. Likewise, precoding matrix continuity check section 120 checks continuity between precoding matrix $\Phi(5)=V(5)$ by which the dedicated RS mapped in subcarrier number 5 is multiplied and precoding matrix $\Phi(8)=V(8)$ by which the dedicated RS mapped in subcarrier number 8 is multiplied as shown in FIG. 7. That is, precoding matrix continuity check section 120 calculates the value $V(8)^H V(5)$ as shown in FIG. 7. The same will apply between subcarriers of subcarrier numbers 8, 11, 14, 17, 20 and 23.

Then, if the complex number of diagonal components in a complex matrix calculated by $V(f1)^H V(f0)$ has the value that is close to 1, precoding matrix continuity check section 120 checks $V(f1)$ and $V(f0)$ are continuous in the frequency domain. On the other hand, if the diagonal component value of the calculation result of $V(f1)^H V(f0)$ is not close to 1, precoding matrix continuity check section 120 checks $V(f1)$ and $V(f0)$ are not continuous in the frequency domain. Then, precoding matrix continuity check section 120 gives the check result "0" when precoding matrices are continuous between continuous subcarriers in the frequency domain (a case where smoothing processing is adopted), and gives the check result "1" when precoding matrices are not continuous between continuous subcarriers in the frequency domain (a case where smoothing processing is not applicable), and generates smoothing applicable/not applicable information.

Then, when the check result shown in the smoothing applicable/not applicable information shows "0" (a case where precoding matrices are continuous between subcarriers), channel estimation section 210 in mobile station 200 performs smoothing processing for a channel estimation result between subcarriers acquired using dedicated RSs. On the other hand, when the check result shown in the smoothing applicable/not applicable information shows "1" (a case where precoding matrices are not continuous between subcarriers), channel estimation section 210 does not perform smoothing processing for a channel estimation result between subcarriers acquired using dedicated RSs.

In this way, according to the present embodiment, the base station checks whether or not precoding matrices are continuous in the frequency domain and notifies to the mobile station whether or not smoothing processing is adopted. By this means, the mobile station is able to check whether or not smoothing processing is applicable between continuous subcarriers in the frequency domain. Accordingly, by performing smoothing processing between only subcarriers for which smoothing processing is allowed, the mobile station is able to improve the accuracy of channel estimation. Consequently, according to the present embodiment, it is possible to check the continuity of precoding matrices that are continuous in the frequency domain and improve the accuracy of channel estimation.

Embodiment 2

With Embodiment 1, whether or not continuous subcarriers in the frequency domain employ continuous precoding matrices is checked. With the present embodiment, a check is made as to whether or not a plurality of precoding matrices are continuous between a plurality of resources block groups, which are subcarrier groups formed with a plurality of subcarriers continuous in the frequency domain.

Now, the present embodiment will be described specifically.

Precoding matrix calculation section 119 in base station 100 (FIG. 4) according to the present embodiment calculates one precoding matrix for each resource block group formed with a plurality of resource blocks. Here, one resource block is formed with a plurality of subcarriers. Further, the number of resource blocks forming a resource block group is set up in advance between base station 100 and mobile station 200. For example, when the number of resource blocks forming a resource block group is three, precoding matrix calculation section 119 averages channel matrices H for 3 RBs, to calculate average channel matrix H'. Then, as shown in equation 2, precoding matrix calculation section 119 performs singular value decomposition of average channel matrix H' to calculate matrix V' as precoding matrix $\Phi'$. Dedicated RSs mapped in subcarriers in these 3 RBs are multiplied by precoding matrices $\Phi'$ that are the same as in precoding section 103.

Precoding matrix continuity check section 120 checks whether or not a plurality of precoding matrices $\Phi$ received as input from precoding matrix calculation section 119 are continuous between a plurality of resource blocks. To be more specific, when the number of resource blocks forming a resource block group is three, precoding matrix continuity check section 120 checks the continuity of precoding matrices at 3-RB intervals. Transmission data and dedicated RSs in a resource block group are multiplied by the same precoding matrix, and therefore precoding matrices are continuous between continuous subcarriers in the frequency domain in the resource block group.

Now, the precoding matrix continuity check processing in precoding matrix continuity check section 120 will be described in detail.

Figure 8:
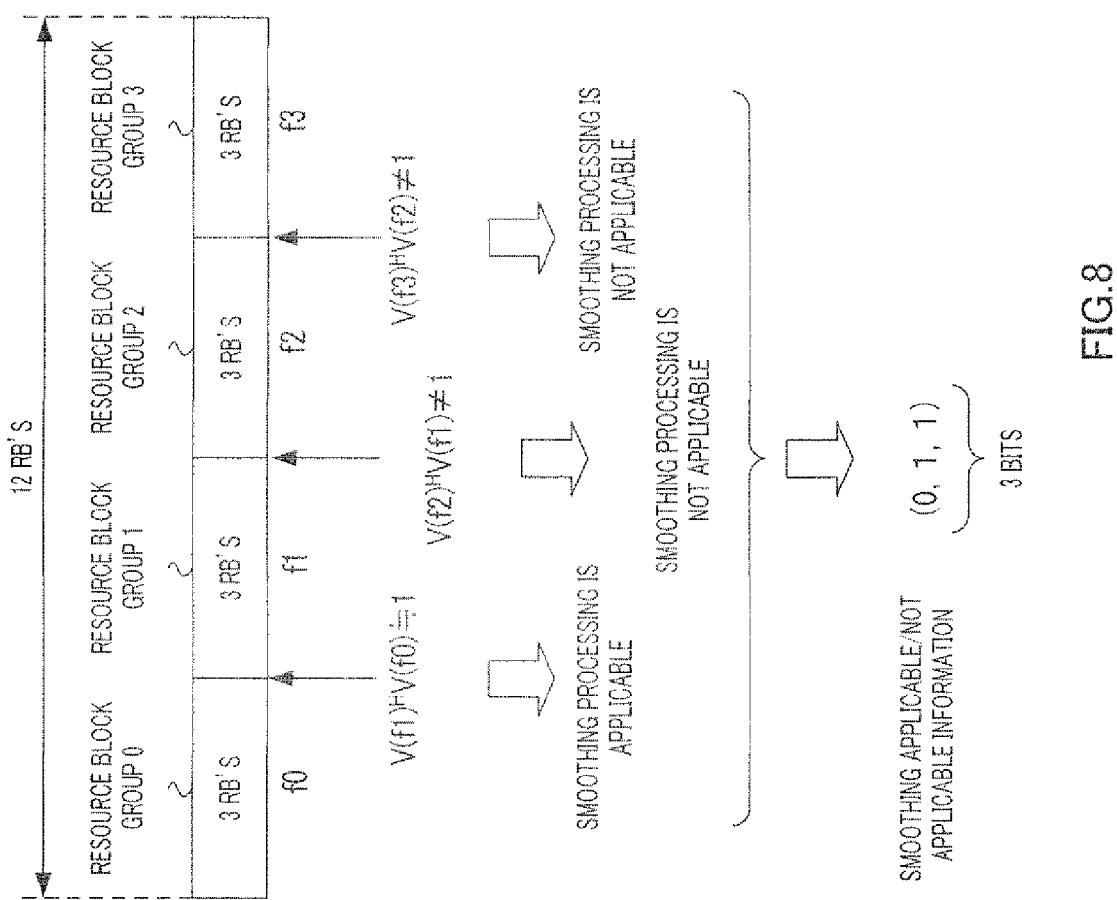
FIG. 8 shows precoding matrix continuity check processing according to Embodiment 2 of the present invention.

Here, 1 RB is formed with 12 subcarriers. Further, as shown in FIG. 8, resource block groups 0 to 3 are each formed with 3 RBs. That is, the same precoding matrix is used in 3 RBs (36 subcarriers) continuous in the frequency domain. Further, the frequencies representing 3-RB resource block groups 0 to 3 shown in FIG. 8 are f0, f1, f2 and f3, respectively.

Precoding matrix continuity check section 120 checks whether or not continuous resource block groups in the frequency domain employ continuous precoding matrices. That is, as shown in FIG. 8, precoding matrix continuity check section 120 checks whether or not precoding matrix Φ(f0)=V (f0) in resource block group 0 in frequency f0 and precoding matrix Φ(n)=V(f1) in resource block group 1 in frequency f1 are continuous. Likewise, precoding matrix continuity check section 120 checks whether or not precoding matrix Φ(f1)=V (f1) in resource block group 1 in frequency f1 and precoding matrix Φ(f2)=V(f2) in resource block group 2 in frequency f2 are continuous. Further, precoding matrix continuity check section 120 checks whether or not precoding matrix Φ(f2)=V (f2) in resource block group 2 in frequency f2 and precoding matrix Φ(f3)=V(f3) in resource block group 3 in frequency f3 are continuous.

Here, as shown in FIG. 8, assuming that the calculation results in precoding matrix continuity check section 120 are as follows.

$$V(f1)^H V(f0) \approx 1$$

$$V(f2)^H V(f1) \neq 1$$

$$V(f3)^H V(f2) \neq 1$$

That is, precoding matrix continuity check section 120 checks that precoding matrix Φ(f0) and precoding matrix Φ(f1) are continuous, precoding matrix Φ(f1) and precoding matrix Φ(f2) are not continuous, and precoding matrix Φ(f2) and precoding matrix Φ(f3) are not continuous. That is, smoothing processing is applicable between precoding matrix Φ(f0) and precoding matrix Φ(f1), smoothing processing is not applicable between precoding matrix Φ(f1) and precoding matrix Φ(f2), and smoothing processing is not applicable between precoding matrix Φ(f2) and precoding matrix Φ(f3).

As shown in FIG. 8, precoding matrix continuity check section 120 generates smoothing applicable/not applicable information of 3 bits, (0, 1, 1).

In this way, by averaging channel matrices H in a resource block group and using the same precoding matrix, precoding matrix continuity check section 120 checks whether or not precoding matrices between resource blocks continuous in the frequency domain are only continuous. Here, 12 RBs shown in FIG. 8 of the present embodiment, precoding matrix continuity check section 120 checks the continuity of precoding matrices about 3 positions (=12/3−1) alone, that is, checks whether or not smoothing processing is applicable for 3 positions (=12/3−1) alone. By this means, by reserving only three bits of smoothing applicable/not applicable information resources for control information (PDCCH), base station 100 is able to notify to mobile station 200 whether or not smoothing is applicable.

By contrast with this, the number of dedicated RSs is four in 1 RB shown in FIG. 7 of Embodiment 1. That is, with Embodiment 1, the continuity of precoding matrices, that is, whether or not smoothing processing is applicable, needs to be checked about 3 (=4−1) positions in 1 RB. That is, with 12 RBs, it is necessary to check the continuity of precoding matrices about 36 (=3×12) positions. In this way, precoding matrix continuity check section 120 according to the present embodiment checks whether or not precoding matrices between resource blocks are only continuous, so that it is possible to reduce overhead due to smoothing applicable/not applicable information for the mobile station compared with Embodiment 1.

In this way, according to the present embodiment, the base station groups a plurality of subcarriers into resource block groups and checks whether or not precoding matrices between resource block groups are only continuous. By this means, according to the present embodiment, compared with Embodiment 1, it is possible to check whether or not smoothing processing is applicable between continuous subcarriers in the frequency domain and reduce overhead due to smoothing applicable/not applicable information notified to the mobile station.

Although a case has been explained with the present embodiment where the number of resource blocks forming a resource block group is three, the number of resource blocks forming a resource block group may be determined between the base station and the mobile station in advance and may be changed dynamically.

Further, in the present embodiment, one precoding matrix may be calculated for resource blocks formed with the number of subcarriers in accordance with channel conditions. Received quality deteriorates when resource block units to group are greater. Then, precoding matrix calculation section 119 calculates precoding matrices for resource block groups, which are subcarrier groups formed with the number of subcarriers based on the difference between the received quality and the desired quality of an effective channel. Specifically, resource blocks are grouped in the range where the difference between the received quality and the desired quality of an effective channel does not influence MCS (Modulation and Coding Scheme) selection. Here, for ease of explanation, a case will be explained where a resource block units to group is either 3 RBs or 6 RBs. Specifically, when frequency selectivity of a channel is low, that is, when channel conditions are flat, the same channel conditions can be acquired even if frequencies are different, and therefore the difference between the received quality and the desired quality of an effective channel is less likely to influence the MCS selection. When a mobile station notifies flat channel conditions to a base station, the base station negotiates with the mobile station to calculate precoding matrices every 6 RBs. Then, precoding matrix calculation section 119 calculates precoding matrices in 6-RB units of greater number of group units. On the other hand, when frequency selectivity of a channel is high, with a 6-RB unit, which is a greater number of resource block units to group, channel conditions fluctuate significantly between subcarriers in 6 RBs. Accordingly, the difference between the received quality and the desired quality of an effective channel is likely to influence the MCS selection. When the mobile station notifies significant frequency selectivity of the channel to the base station, the base station negotiates with the mobile station to calculate precoding matrices every 3 RBs. Then, by calculating precoding matrices in 3-RB units of a smaller number of group units, precoding matrix calculation section 119 increases the effect of beam forming. In this way, by satisfying desired quality and by grouping the maximum number of resource blocks in the frequency domain, the base station is able to reduce the amount of calculation of precoding matrices and reduce overhead further by smoothing applicable/not applicable information. Further, the mobile station is able to apply smoothing processing to more subcarriers, so that it is possible to improve the accuracy of channel estimation.

Further, in the present embodiment, the mobile station may notify to the base station in advance whether or not the mobile station supports smoothing processing. Also, the mobile station may notify to the base station not to perform smoothing processing temporarily to reduce power consumption. By this means, the base station is able to check that the mobile station does not perform smoothing processing. Accordingly, the base station is able to calculate precoding matrices to perform dedicated beam forming optimally without taking into account the continuity in the frequency domain.

Embodiments of the present invention have been explained.

Although cases have been explained with the above embodiments where TDD is assumed as the uplink and downlink signal multiplexing method and where a base station directly estimates a downlink channel from a received signal from a mobile station (an uplink signal), according to the present invention, a mobile station may transmit data showing a downlink channel to the base station. That is, a downlink channel may be estimated in a base station.

Although cases have been explained with the above embodiments where the smoothing applicable/not applicable information is included in control channel (PDCCH), the smoothing applicable/not applicable information may be notified to the mobile station from the base station and the notifying method is not limited. For example, with the present invention, common RSs (e.g. R0 and R1 shown in FIG. 7) with a phase rotation in accordance with a check result shown in smoothing applicable/not applicable information may be transmitted. Specifically, when the continuity check result between subcarriers shows continuity (when the check result is "0"), the phase of common RSs is + in the base station, and, when the continuity check result between subcarriers shows discontinuity (when the check result is "1"), the phase of common RSs is—(the phase is reversed) in the base station. By this means, the base station is able to notify smoothing applicable/not applicable information to the mobile station without using control information (PDCCH). That is, the base station is able to notify smoothing applicable/not applicable information without increasing overhead of control information.

Further, with the present invention, in a multicarrier signal, control information showing smoothing applicable/not applicable information mapped in specific subcarriers in which normal signals (e.g. a data signal, a control signal and a pilot signal) are not mapped may be transmitted. For example, the base station may map smoothing applicable/not applicable information in the DC carrier, that is, the subcarrier of the center frequency in a multicarrier signal. Further, the base station may map smoothing applicable/not applicable information in guard carriers, which are subcarriers for reducing interference from neighboring cells and which are subcarriers mapped in both sides of subcarriers for mapping normal signals. In this way, the base station uses resources that cannot be used for normal signals as resources for smoothing applicable/not applicable information, so that the base station is able to notify whether or not smoothing is applicable without increasing control information overhead.

Further, when smoothing applicable/not applicable information is defined semi-statically, with the present invention, smoothing applicable/not applicable information may be notified semi-statically using an upper layer.

A mobile station may be referred to as a "UE," a base station apparatus may be referred to as a "Node B," and a subcarrier may be referred to as "tone." Further, a CP may be referred to as "GI (Guard Interval)." Further, smoothing processing may be referred to as "window processing."

Further, the conversion method between the frequency domain and the time domain is not limited to IFFT or FFT.

Further, the present invention is applicable to not only base stations and mobile stations, but also applicable to all radio communication apparatus.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-332515, filed on Dec. 25, 2007, including the specification, drawings and abstract, is incorporated herein by reference in its entirety.

INDUSTRIAL APPLICABILITY

The present invention is applicable to, for example, mobile communication systems.

The invention claimed is:

1. A user equipment (UE) apparatus comprising:
   a receiver configured to receive data and UE-specific reference signals, which are mapped to a plurality of resource blocks each formed of multiple subcarriers, the plurality of resource blocks being grouped into resource block group(s) and a resource block group being a unit in which a same precoder is applied; and
   an estimator configured to perform a downlink channel estimation based on the UE-specific reference signals,
   wherein the estimator applies a smoothing operation to a result of the downlink channel estimation over two or more resource block groups, if two or more precoders respectively applied in the two or more resource block groups are continuous in a frequency domain.

2. The UE apparatus according to claim 1,
   wherein the estimator performs the downlink channel estimation based additionally on the number of resource blocks that constitute one resource block group.

3. The UE apparatus according to claim 2, wherein the estimator estimates a precoder for each resource block group based on the UE-specific reference signals.

4. The UE apparatus according to claim 1, wherein the precoder is a precoding matrix.

5. The UE apparatus according to claim 1, wherein the same precoder is applied to the UE-specific reference signals mapped to the resource 1 blocks included in the resource block group.

6. A demodulation method comprising:
   receiving data and UE-specific reference signals, which are mapped to a plurality of resource blocks each formed of multiple subcarriers, the plurality of resource blocks being grouped into resource block group(s) and a resource block group being a unit in which a same precoder is applied; and performing a downlink channel estimation based on the UE-specific reference signals; and applying a smoothing operation to a result of the downlink channel estimation over two or more resource block groups, if two or more precoders respectively applied in the two or more resource block groups are continuous in a frequency domain.

7. The demodulation method according to claim 6, further comprising:

performing a downlink channel estimation based additionally on the number of resource blocks that constitute one resource block group.

8. The demodulation method according to claim 7, further comprising estimating a precoder for each resource block group based on the UE-specific reference signals.

9. The demodulation method according to claim 6, wherein the precoder is a precoding matrix.

10. The demodulation method according to claim 6, wherein the same precoder is applied to the UE-specific reference signals mapped to the resource blocks included in the resource block group.

\* \* \* \* \*